United States Patent [19]
Spadano

[11] 3,793,120
[45] Feb. 19, 1974

[54] MACHINE FOR HEAT SEALING TOGETHER THE EDGES OF PLASTIC SHEETS AND THE LIKE

[76] Inventor: Vincenzo Spadano, 273 Maryland St., Winnipeg, Manitoba, Canada

[22] Filed: Jan. 28, 1972

[21] Appl. No.: 221,683

[52] U.S. Cl. ............................. 156/499, 156/304
[51] Int. Cl. ............................................. B32b 31/00
[58] Field of Search..................... 156/499, 583, 304

[56] References Cited
UNITED STATES PATENTS

| | | | |
|---|---|---|---|
| 2,665,738 | 1/1954 | Caskin | 156/499 |
| 3,013,925 | 12/1961 | Larsen | 156/499 |
| 2,384,014 | 9/1945 | Cutter | 156/499 |
| 2,972,371 | 2/1961 | Hermann et al. | 156/499 |
| 3,175,939 | 3/1965 | Hanes et al. | 156/499 |
| 3,391,045 | 2/1968 | Mojonnier et al. | 156/499 |
| 3,682,748 | 8/1972 | Kimball | 156/499 |

*Primary Examiner*—Douglas J. Drummond
*Attorney, Agent, or Firm*—Stanley G. Ade

[57] ABSTRACT

Clamp bars on a fixed table hold one piece of plastic and clamp bars on a movable table hold the other. An elongated electric heat shoe moves up between the tables, the movable table moves towards the fixed table thus engaging the edges of the plastic pieces against the heat shoe. When welding temperature is reached, the movable table opens sufficiently to enable the heat shoe to retract downwardly whereupon the movable tables moves towards the fixed table until the partially melted edges of the plastic abut under pressure so that they weld together.

21 Claims, 9 Drawing Figures

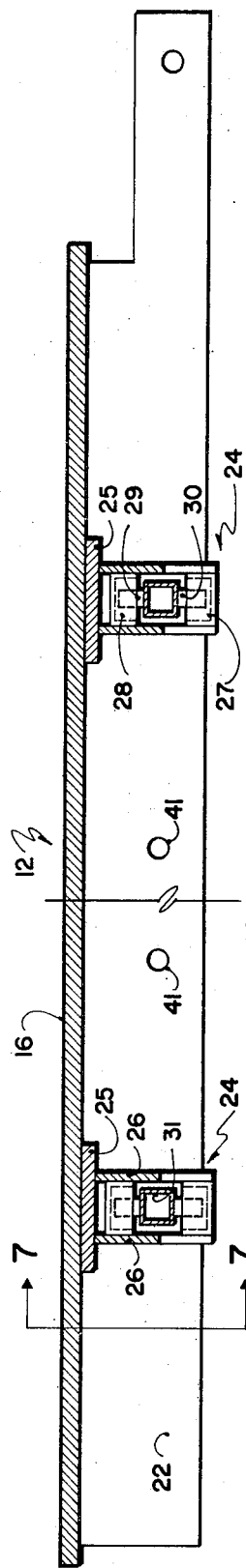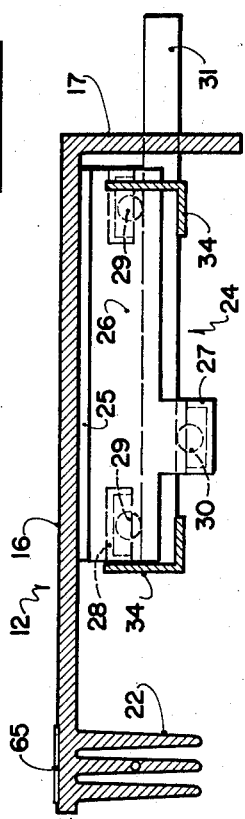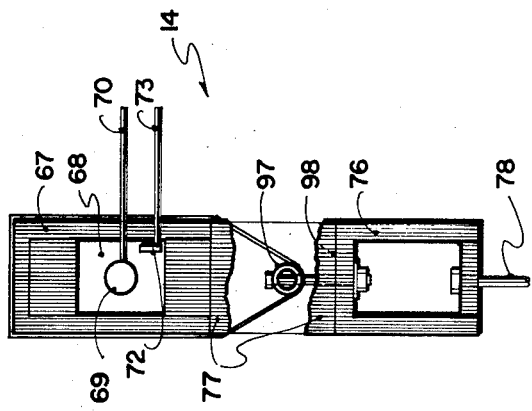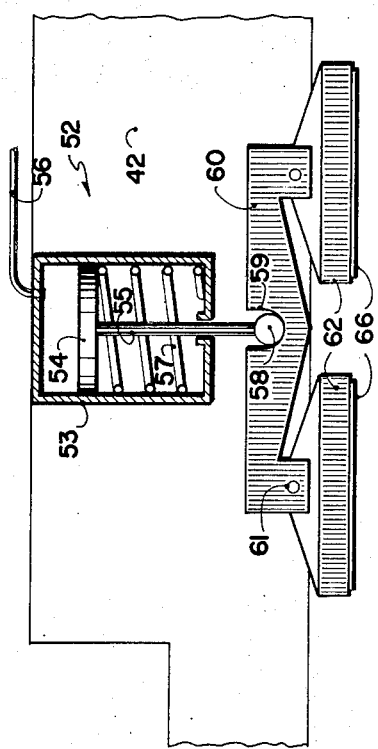
FIG. 6
FIG. 7
FIG. 8
FIG. 9

MACHINE FOR HEAT SEALING TOGETHER THE EDGES OF PLASTIC SHEETS AND THE LIKE

BACKGROUND OF THE INVENTION

Considerable difficulty is experienced in welding together adjacent edges of sheets of plastic so that a continuous planar sheet may be formed from sheets of smaller sizes. Similarly cylindrical plastic components are difficult to form unless extruded initially. The difficulty arises in the uniform heating of the adjacent edges to a temperature where these edges are just melting and then removing the source of heat so that the edges may be pressed together relatively equally in order that they may be welded together.

SUMMARY OF THE INVENTION

This invention overcomes disadvantages inherent in these procedures by the provision of a device which allows adjacent edges of plastic to be clamped, a heating element to be moved upwardly therebetween so that the edges may engage the heating element, by providing means to withdraw the heating element once the predetermined temperature is reached and by providing means to abut the edges together under equal pressure so that they may be welded together.

The principal object and essence of the invention is to provide a device of the character herewithin described which enables edges of plastic sheets to be butt welded together by heat sealing means.

Another object of the invention is to provide a device of the character herewithin described which enables the machine to be adapted for use to weld adjacent edges of a cylindrical length of plastic formed from a planar plastic sheet.

A still further object of the invention is to provide a device of the character herewithin described which includes a fixed table and a movable table, the movable table moving away from the fixed table so that the heating element may be moved upwardly and downwardly therebetween.

Another object of the invention is to provide a device of the character herewithin described which enables plastic sheets of any thickness within the limits of the heating element, to be welded together readily and easily.

A yet further object of the invention is to provide a device of the character herewithin described which is relatively simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

FIG. 6 is a fragmentary side view of the movable table and supports per se.

FIG. 7 is a view substantially along the line 7—7 of FIG. 6.

FIG. 8 is a partial sectional side view of one of the clamp assemblies.

FIG. 9 is an end view of the heat shoe assembly per se enlarged with respect to the remaining views.

In the drawings like characters of reference indicate corresponding parts in the different figures.

PRELIMINARY DESCRIPTION

Figure 1:
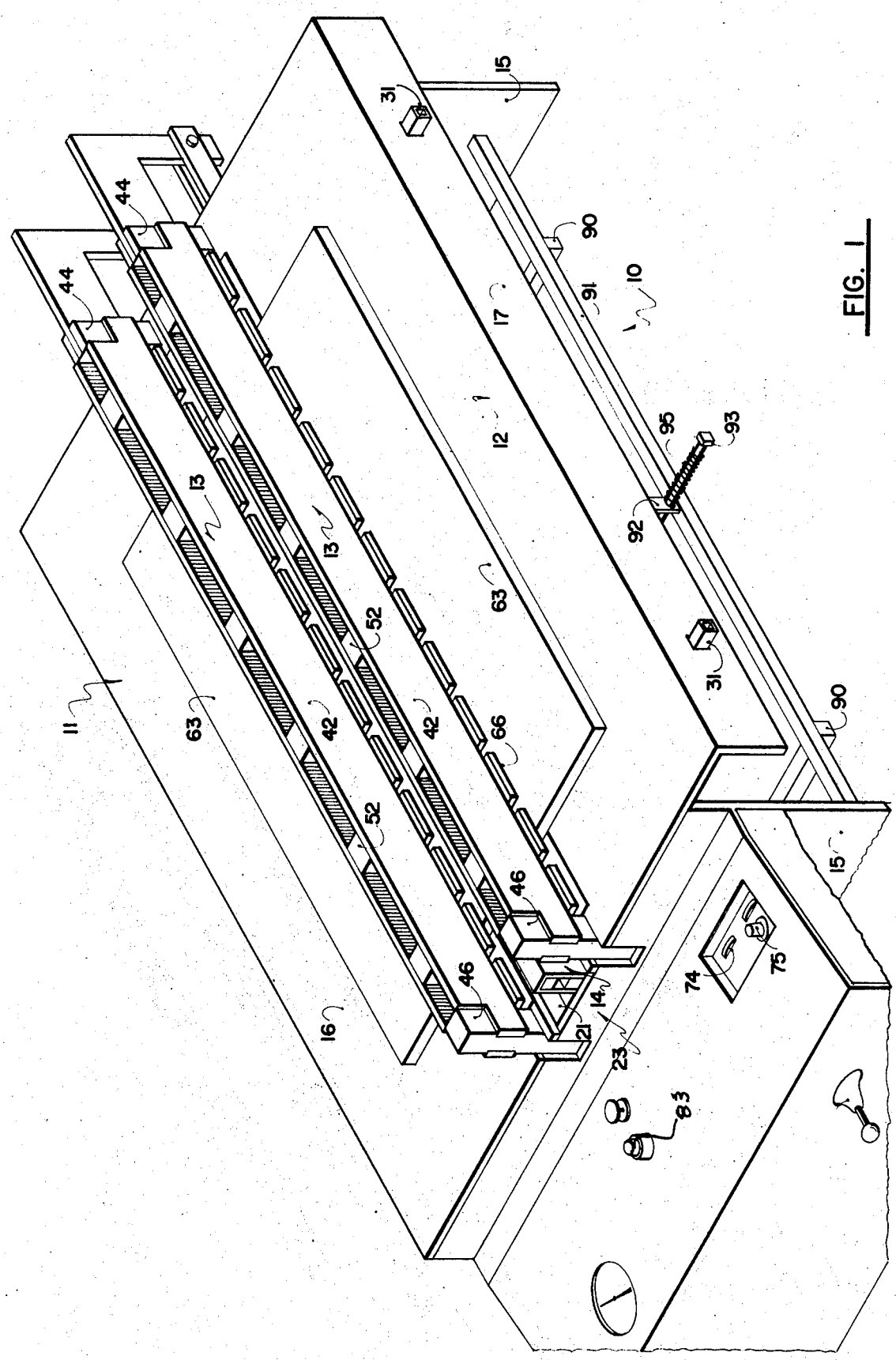
FIG. 1 is an isometric view of the device reduced in scale with reference to the remaining drawings.

The device consists of supporting structure collectively designated 10 having a fixed table generally shown at 11 supported thereby and a movable table generally indicated at 12 also supported for inward and outward movement relative to the fixed table 11.

Clamping assemblies generally designated 13 are supported above each table and assist in clamping sheets of plastic thereto with the abutting edges adjacent one another and a heat shoe assembly generally shown at 14 is mounted within the frame-work and is capable of being moved upwardly between the two tables when the movable table is moved apart from the fixed table. When the heat shoe assembly is in the uppermost position, the movable table closes so that the edges of the two sheets of plastic engage the sides of the heat shoe assembly and are heated thereby. When the desired temperature is reached, the movable table parts thus allowing the heat shoe assembly to retract downwardly whereupon the movable table closes abutting the two partially melted edges of the plastic together so that they are welded along the entire length thereof.

DETAILED DESCRIPTION

The supporting structure includes among other things, two end plates 15 situated in spaced apart relationship and being braced at the lower sides thereof by further member (not illustrated).

The fixed table 11 is a cast member having an upper planar horizontal surface 16 and a down turned outer edge flange 17 and the upper portion 16 is secured to the end support members 15 by means of angle brackets 18 secured to the underside of the upper portion 16 by means of screws 19 and to the end plate supports 15, by means of screws 20.

Situated towards the inner edge 21 of the fixed table 11 and depending downwardly therefrom are reinforcing portions 22 which are cast in place with the table 11.

The movable table 12 is formed in a similar manner and similar reference characters have therefore been used to depict the various portions, with the exception of the inner edge which is specifically designated 21A.

The movable table 12 is mounted for in and out horizontal motion relative to the fixed table 11 so that when the inner edges 21 and 21A of the tables are apart, a longitudinally extending gap 23 is defined by these inner edges.

The movable table 12 is mounted for this in and out movement by the provision of a pair of casings (see FIGS. 6 and 7) generally designated 24. These casings include an upper securing member 25 secured to the underside of the table and extending from adjacent the inner edge 21A towards the outer edge or outer flange 17. A pair of side walls 26 extends downwardly from this attaching member 25 and a base 27 spans the lower edges of the side walls. Situated within the casing and recessed within an upper member 28 just below the attaching member 25, is a pair of roller type bearing races 29 so mounted that they project downwardly into the relatively rectangular cross sectional area defined by the walls of the casing.

Intermediate the ends of the casing is a lower roller type bearing race 30 which extends upwardly into the square cross sectional area defined by the walls of the casing.

Figure 4:
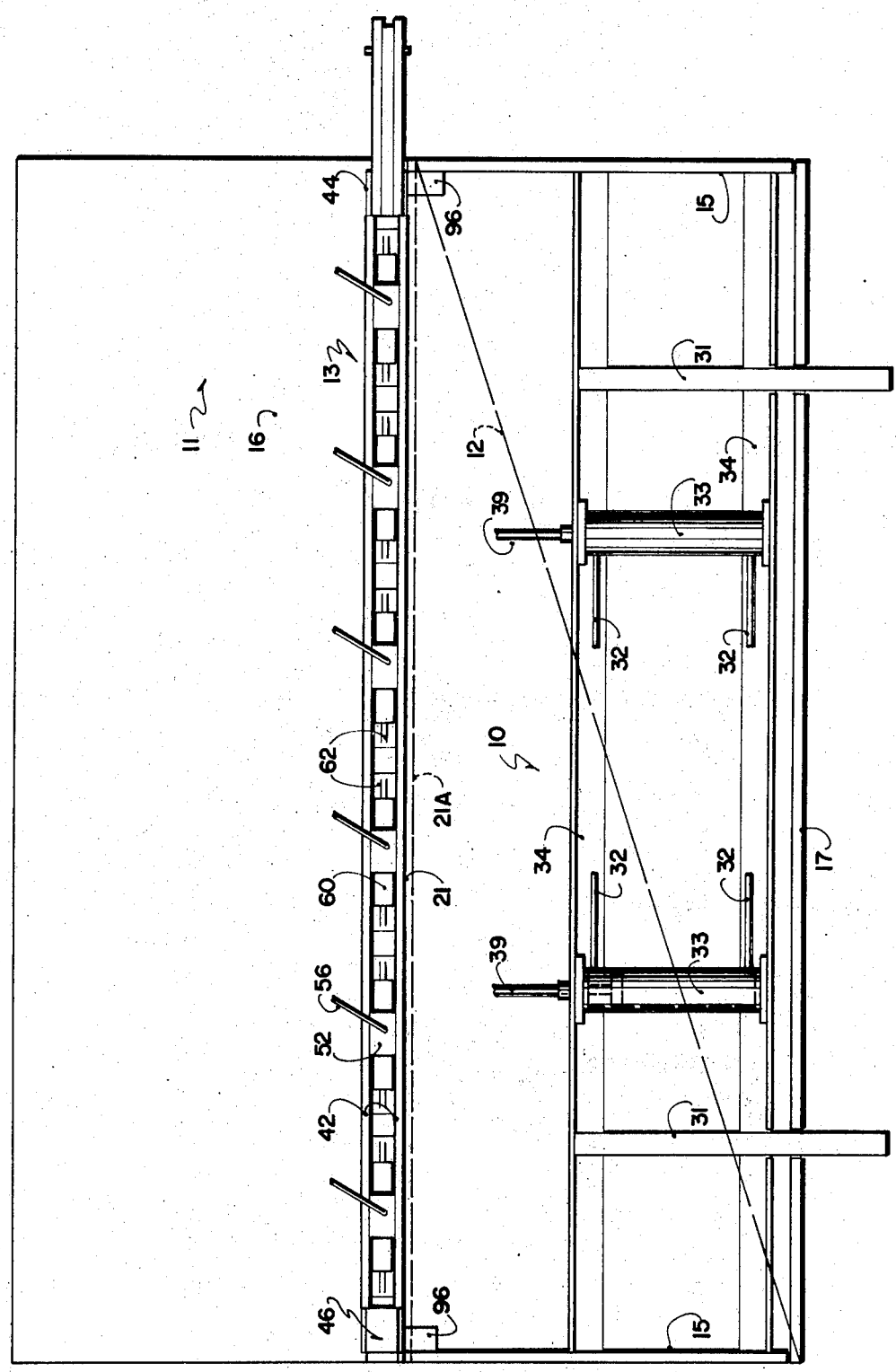
FIG. 4 is a fragmentary plan view of FIG. 3 with the heat shoe assembly deleted for clarity.

A pair of bearing members 31 take the form of square cross sectional bars and are supported upon two transverse members 34 (see FIG. 4) forming part of the support structure and extending between the end support members 15 and these tubes or bearing members pass through the casings 24 so that the upper bearing races 29 register upon the upper surface of these square bearing members and the lower bearing race 30 engages the underside thereof thus supporting the table for horizontal rolling movement towards and away from the fixed table 11, it being understood, of course, that members 34 and 31 are positioned so that the table can move the required amount in and out, without obstruction.

Means are provided to move the movable table 12 in and out and take the form of fluid operators 33 mounted on members 34 which in turn are supported upon the end members 15. These fluid operators take the form of pneumatic piston and cylinder assemblies, double acting in function, and connected via conduits 32 to a source of pneumatic pressure shown partially schematically in FIG. 2. This source takes the form of an electric motor 35 driving a compressor 36 which in turn supplies compressed air to main tank 37. It is routed via conduit 38 to the various fluid operators by conventional means, the necessary valves (not illustrated) being provided. However, as these are conventional it is not believed necessary to explain the construction and operation of these various valves in this specification.

Figure 2:
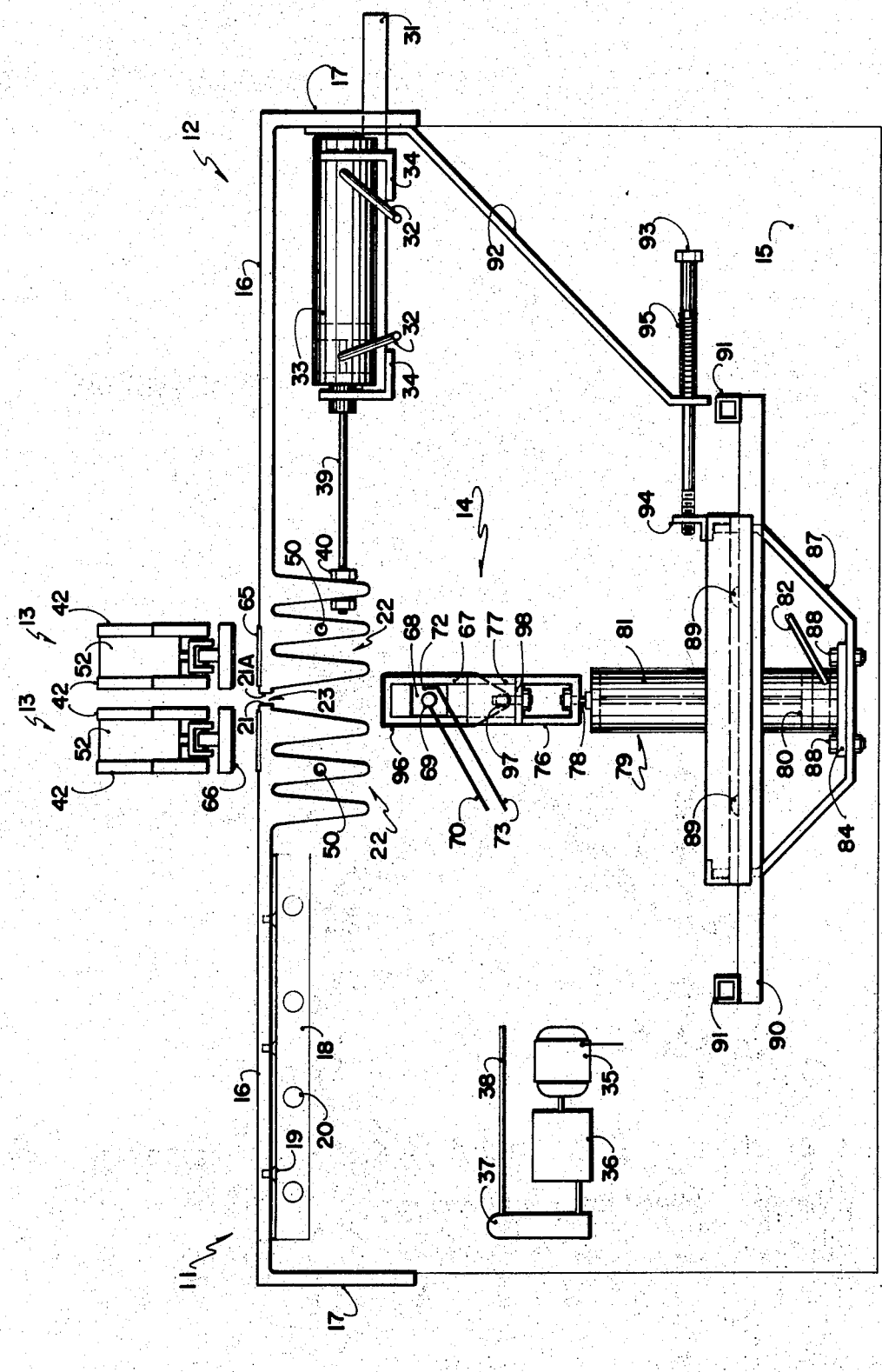
FIG. 2 is an end view with the end panel removed for clarity and some parts sectioned for clarity.

The fluid operators 33 include a piston rod 39 which is secured by means of nuts 40 to one of the strengthening flanges 22 of the movable table 12 as clearly shown in FIG. 2, it being understood that the ends of the piston rods are screw threaded to receive the nuts 40. In this connection reference to FIG. 6 shows the apertures 41 in the flange 22 of the movable table 12.

It will therefore be seen that the table 12 can be moved in and out relative to the fixed table 11.

Situated upon each of the tables 11 and 12 and spaced above same adjacent the inner edges 21 and 21A respectively, are the plastic sheet clamping assemblies collectively designated 13. As they are both constructed in a similar manner, only one will be described although similar reference characters have been given to each.

An elongated beam 42 is provided with a projecting portion 43 at one end which engages an upstanding apertured holder 44 secured to the table top at one end thereof.

A projecting portion 45 (see FIG. 3) is formed on the other end of the beam 42 and is detachably supported adjacent the other end of the tables by means of a key member 46. This key member includes a vertical portion 47 apertured as at 48 and having a cylindrical shaft 49 extending from adjacent the lower side thereof. This shaft engages a horizontal drilling 50 formed in the end of the tables. When in the position shown in FIG. 3, the key can be swung downwardly rotating upon the shaft 49 so that a cylindrical length of plastic may be slid between the clamping assemblies and the table for welding purposes. Once it has been engaged, the key member is rotated upwardly to the position shown in FIG. 3 whereupon it is moved inwardly so that the projecting portion 45 engages the aperture 48 thus supporting the beam at this end of the table in a manner similar to the support of the other end, namely in spaced and parallel relationship to the table top. The in and out movement of the key is indicated by the double headed arrow 51.

Mounted within the beam 42 is a plurality of fluid operators 52 each including a cylinder 53, a piston 54 (see FIG. 8) and a piston rod 55. A conduit 56 connects the upper side of the cylinders to the aforementioned source of fluid power and a compression spring 57 upon the undersides of the pistons reacts between the pistons and the bases of the cylinders and normally maintains the pistons in the uppermost position.

A cross bar 58 is secured to the lower ends of the piston rods 55 and engages lugs 59 provided centrally of a balance bar 60 thus pivotally mounting the balance bar for tilting action relative to the piston rod 55.

Pivotally mounted adjacent each end of the balance bar 60 and depending downwardly therefrom upon pivot pins 61 is a plastic sheet engaging shoe mounted intermediate the ends thereof also for pivotal or rocking action relative to the balance bar 60. It should be understood that there is a balance bar and a pair of shoes for each fluid operator 52.

From the foregoing it will be appreciated that downward action of the pistons by fluid pressure, causes the shoes to engage the plastic sheets 63 (see FIG. 1) thus clamping them evenly and firmly to the tables 11 and 12 with the edges 64 overlying the inner edges 21 and 21A of the tables. In this connection a strip of friction material 65 is recessed within the table tops adjacent the inner edges thereof, said material taking the form of a rubberized canvas or similar material. Similarly strips 66 are secured to the underside of the shoes 62. This assists in preventing sideways movement of the plastic sheets once they are clamped in position.

Means are provided to heat the edges 64 of the plastic sheet to a semi-molten condition, said means taking the form of the aforementioned heat shoe assembly 14.

This assembly includes a rectangular cross sectioned elongated casing 67 having a core 68 within which is embedded an electric element 69 extending from one end of the casing to the other. Said element is operatively connectable to a soruce of electrical energy via a flexible conductor 70 (see FIG. 3) in which view it is shown schematically. This in turn connects to the main electrical cord 71 shown in FIG. 1 extending from the machine and this cord may be plugged in to the usual power outlet (not illustrated).

Figure 3:
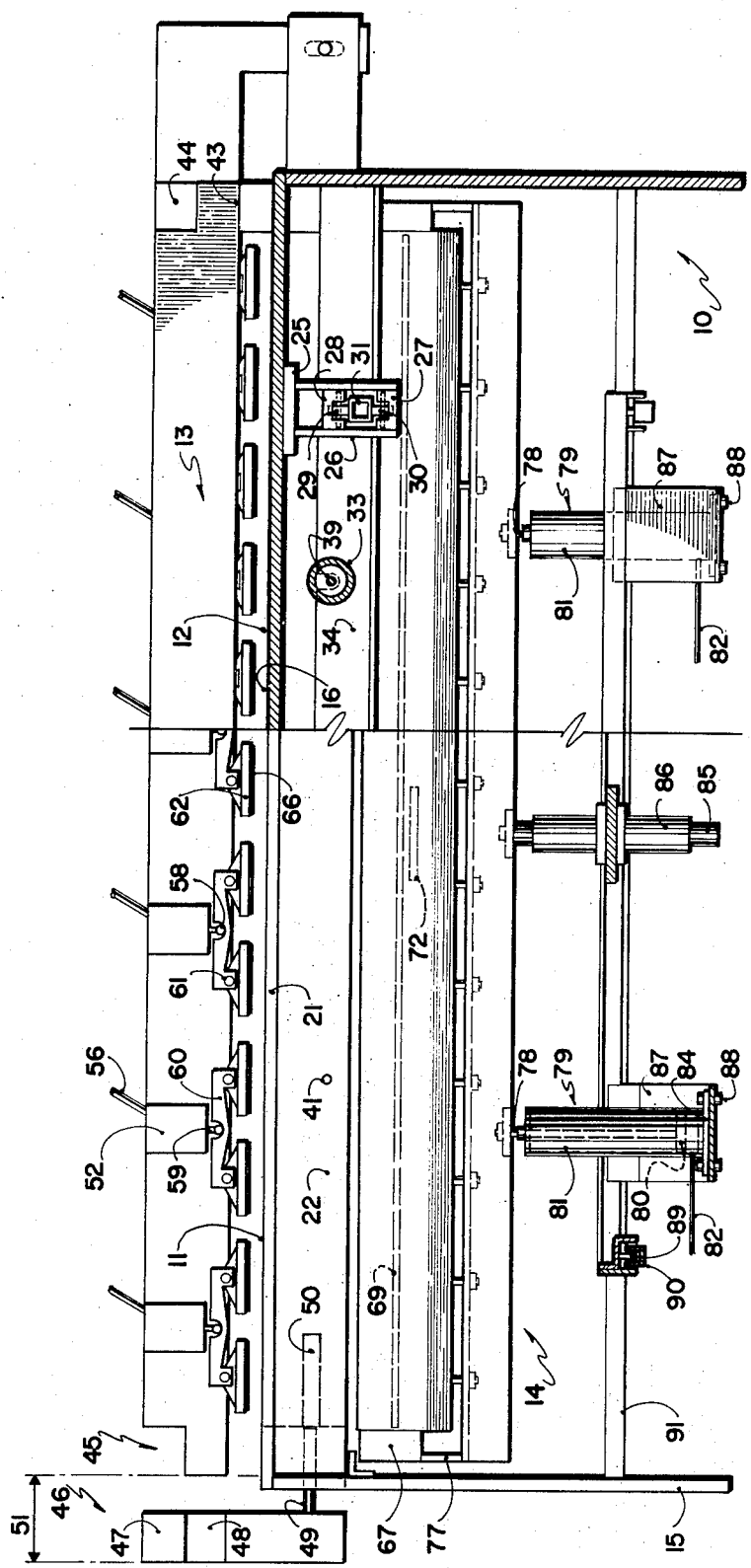
FIG. 3 is a side view of FIG. 2 but with the movable table and end panel removed for clarity.

A sensor unit 72 is shown schematically in FIG. 3 and extends from the center of the shoe assembly via a flexible connector 73 to a conventional thermostatically controlled assembly (not illustrated) which in turn is connected to a thermometer dial 74 so that the heat of the element can be controlled by means of a control 75 both of which are shown in FIG. 1 in a schematic fashion.

However, as such assemblies are conventional, it is not believed necessary to describe same further.

An elongated holder 76 supports the heat shoe assembly 14 by means of end plates 77 depending downwardly from each end of the assembly 14 and being secured to each end of the holder 76 and this holder in turn is secured to the upper end of the piston rod 78 of the fluid operator 79, there being two such fluid operators in the present embodiment in spaced apart relationship and situated vertically within the supporting structure. The piston 80 reciprocates within the cylinder 81 and the source of pneumatic pressure is operatively connected to the lower side of the cylinder by means of a conduit 82 through suitable valving and operated by means of a button 83 shown schematically in FIG. 1.

Routing air into the lower ends of cylinders 81, causes the pistons to move upwardly thus elevating the heat shoe assemblies as will hereinafter be described.

Figure 5:
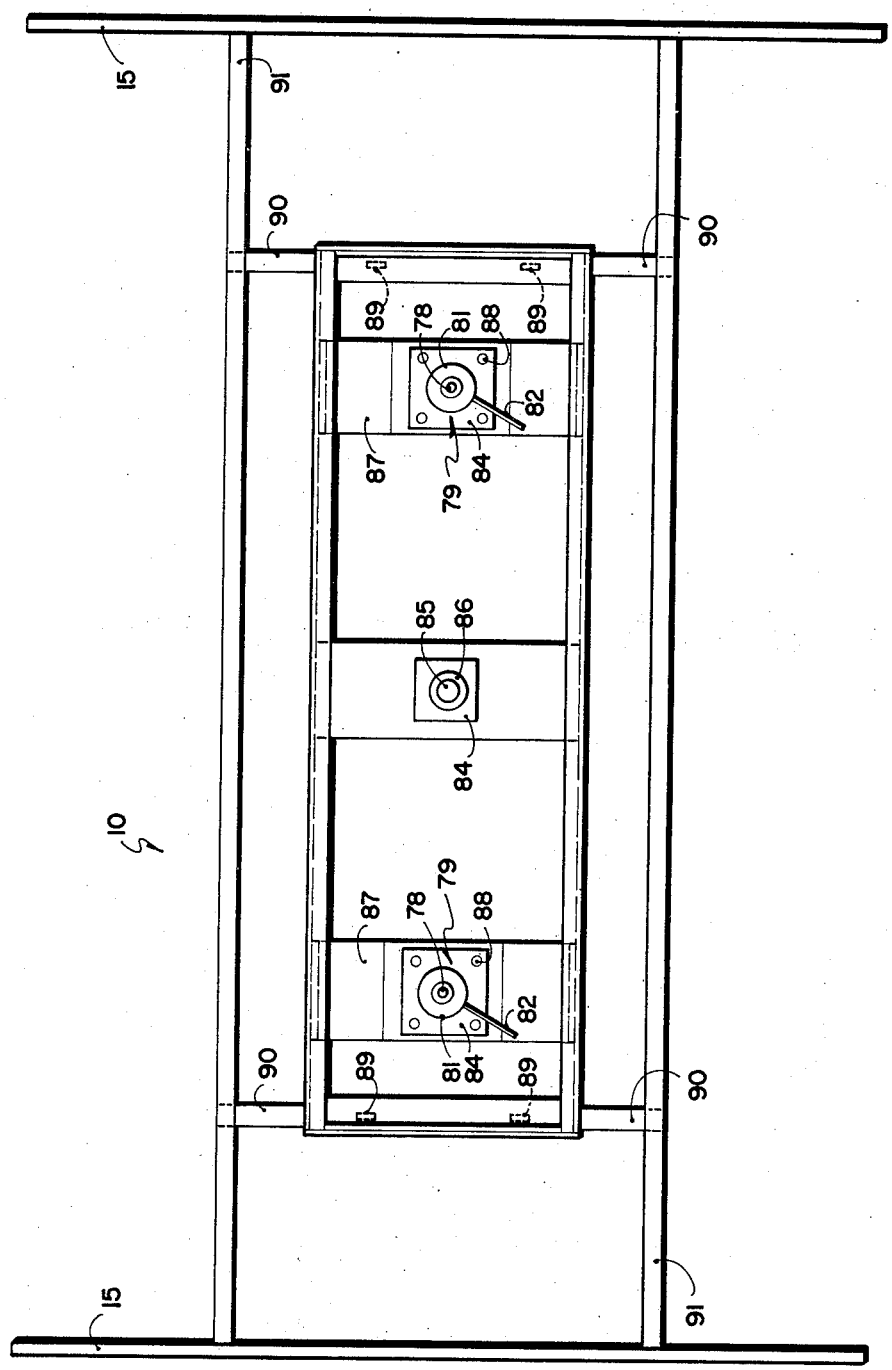
FIG. 5 is a fragmentary plan view of the frame assembly supporting the heat shoe assembly.

It is necessary for the heat shoe assembly 14 together with the fluid operators 79 to move horizontally within limits, for reasons hereinafter to be described and means are provided for this movement. In this connection it is desirable to have a central guide assembly collectively designated 84 and shown in FIGS. 3 and 5. It takes the form of a shaft 85 secured to the underside of the holder 76 and running within a sleeve 86 mounted as will now be described.

The fluid operators 79 together with the support assembly 84 are secured by the lower ends thereof within hanger bracket assemblies 87 by means of bolts 88 and these hanger bracket assemblies are provided with roller bearing type races 89 which engage within bearing cases 90 supported upon support members 91 extending between the end supports 15 (see FIGS. 2 and 3). It should of course be understood that the sideways movement of the heat shoe assembly is relatively small.

Means are provided to initiate this sideways movement but prior to describing this, the sequence of operation will be described.

The sheets of plastic 63 are engaged under the shoes 66 upon the two table tops 11 and 12 with the inner edges 64 overlying the inner edges 21 and 21A respectively of the tables 11 and 12. The clamping assemblies are then operated thus holding the sheets firmly in the desired position.

The fluid operators 33 are then engaged to move the movable table 12 apart from the fixed table 11 thus enabling the heat shoe assembly to be moved upwardly between the plastic sheet edges as shown in FIG. 1.

When the heat shoe assembly is in the uppermost position, the movable table 12 is moved towards the fixed table 11 thus engaging the edges 64 of the plastic sheets with the sides of the elongated casing 67 of the heat shoe assembly. Heat generated by the element 69 flows by convection to the edges and heats same to the predetermined temperature previously ascertained so that these edges become semi-molten. In this connection the thermometer gauge 74 may be utilized to ensure that the predetermined temperature is reached. Once this temperature is reached, the movable table 12 is move slightly apart thus enabling the heat shoe assembly to descend or retract by gravity whereupon the movable table is once again moved towards the fixed table so that the semi-melted edges 64 of the plastic sheets abut one another under pressure and are therefore welded together. The pressure remains until the edges have hardened and the weld is complete.

It will therefore be appreciated that the heat shoe assembly has to be moved to the right with reference to FIG. 2 prior to the upward movement thereof and, once in position, has to move slightly to the left with reference to FIG. 2, so that the edges of the plastic can engage both sides of the casing equally.

Reference to FIG. 2 will show the method of accomplishing this sideways movement in the sequence desired.

A bracket assembly 92 is secured by the upper end thereof to the outer flange 17 of the movable table 12 and extends downwardly and inwardly diagonally towards the fluid operator 79 to engage a bolt 93 which in turn is supported upon the upper side of the hanger 87 by means of a flange 94, it being understood, of course, that the lower end of the bracket assembly is apertured to slide freely upon bolt 93.

A compression spring 95 reacts between the bolt head and the bracket 92 and this together with the bolt constitutes a lost motion assembly which delays sideways movement of the heat shoe assembly together with its attendant fluid operators and support 84.

When the movable table 12 is moved to the right with reference to FIG. 2, the bracket first slides on bolt 93 compressing spring 95 so that no sideways movement of the heat shoe assembly takes place. However, as the spring is compressed and becomes virtually solid, further movement of the table 12 to the right with reference to FIG. 2 will move the entire heat shoe assembly together with the fluid operators and support 84 also to the right to a position where the heat shoe assembly is situated below the gap defined by the inner edges 21 and 21A of the two tables 11 and 12.

The fluid operators 79 are not actuated so that the heat shoe assembly moves upwardly within the gap and between the edges 64 of the plastic sheets 63.

The table now closes or moves to the left with reference to FIG. 2 so that the edge 64 of the sheet secured to table 12 engages the heat shoe assembly and moves it to the left with spring 95 taking up the lost motion. As soon as the heat shoe assembly engages the edge 64 of the plastic sheet 63 held by the fixed table, the leftward motion of the table 12 ceases.

In this connection it is not desirable to maintain the heat shoe assembly in the uppermost position by fluid pressure and in this connection reference to FIG. 3 will show a pair of ledge brackets 96 secured to the ends 15 and as the heat shoe assembly is moved leftwardly with regard to FIG. 2 as hereinbefore described, the elongated holder 76 engages the offstanding portions of these brackets 96 and the heat shoe assembly is thereby supported by these brackets during the heating sequence of the operation.

When the edges are heated sufficiently as hereinbefore described, the table 12 is moved outwardly by the fluid operators 33. Once again there is no initial movement of the heat shoe assembly until spring 95 is compressed and the entire assembly is then moved to the right with reference to FIG. 2 disengaging the holder from the brackets 96 and allowing the heat shoe assembly to descend by gravity. As soon as it has cleared the underside of the tables, the movable table 12 moves to the left so that the edges 64 of the plastic sheets are abutted together under pressure as hereinbefore described.

Finally, means are provided to prevent the adhesion of the semi-melted plastic to the sides of the casing 67, said means taking the form of a flexible plastic sleeve made of glass fibre or the like and indicated by reference character 96. An end view of this is shown in FIG. 9 which shows the sleeve enveloping the casing 67 and also extending around an elongated anchor member 97 situated between the end plates 77 and between the casing 67 and the elongated holder 76.

Bolts extend through apertures in the upper side 98 of the casing and are screw threadably engageable through the anchor member 97 which may take the form of a tube or bar. This anchor member is spaced above the upper side 98 of the holder so that by tightening bolts 97, tension may be applied to the sleeve thus holding it tightly in engagement with the casing 67. This does not interfere with the heat transfer but prevents adhesion of melted plastic to the sides of the heat shoe assembly.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. A device for heat sealing together abutting edges of thermosetting plastic in association with a source of fluid power and a source of electrical energy; comprising in combination supporting structure, a fixed planar table supported on said supporting structure, a movable planar table also supported on said supporting structure and movable in the same plane as said fixed table, means mounting said movable table for movement towards and away from said fixed planar table, means to move said movable table as aforesaid, the adjacent inner edges of said table defining between them, a longitudinally extending gap when said tables are apart, a heat shoe assembly, means supporting said heat shoe assembly in said supporting structure, means for moving said heat shoe assembly from a position below said tables to a position in between said tables within said longitudinally extending gap, and means on each of said tables to clamp portions of plastic sheet to said tables with the adjacent edges of said plastic portions overlying the edges of said tables defining said longitudinally extending gap, said means mounting said movable table for movement including at least two bearing members secured to said supporting structure and extending in spaced and parallel relationship from said supporting structure toward said fixed table and parallel to the planar surface thereof, and means under said movable table and secured thereto bearably supporting said movable table for movement towards and away from said fixed table, said last mentioned means including a casing secured under said movable table and extending from adjacent said inner edge thereof to adjacent the outer edge thereof, at least two upper roller type bearing races supported in the upper side of said casing in spaced apart relationship and at least one lower roller type bearing race supported in the lower side of said casing between said two roller type bearing races, said bearing members engaging between said upper and lower bearing races thereby supporting said table for rolling movement therealong.

2. The device according to claim 1 in which said means to move said movable table includes at least one fluid operator secured to said supporting structure and connected to the underside of said movable table, said fluid operator being operatively connected to said source of fluid power.

3. A device for heat sealing together abutting edges of thermosetting plastic in association with a source of fluid power and a soruce of electrical energy; comprising in combination supporting structure, a fixed planar table supported on said supporting structure, a movable planar table also supported on said supporting structure and movable in the same plane as said fixed table, means mounting said movable table for movement towards and away from said fixed planar table, means to move said movable table as aforesaid, the adjacent inner edges of said table defining between them, a longitudinally extending gap when said tables are apart, a heat shoe assembly, means supporting said heat shoe assembly in said supporting structure, means for moving said heat shoe assembly form a position below said tables to a position in between said tables within said longitudinally extending gap, and means on each of said tables to clamp portions of plastic sheet to said tables with the adjacent edges of said plastic portions overlying the edges of said tables defining said longitudinally extending gap, said heat shoe assembly including an elongated casing, an elongaged electric element in said casing, means operatively connecting said element to said source of electrical energy, an elongaged holder supporting said casing and said element, said means for moving said heat shoe assembly including at least one fluid operator in said supporting structure, said holder being secured to the piston rod of said fluid operator, said fluid operator being operatively connected to said source of fluid power, said fluid operator adapted to move said heat shoe assembly vertically relative to said tables.

4. The device according to claim 3 in which said means for moving said heat shoe assembly also includes further means for moving same sideways relative to said tables, said last mentioned means including a support assembly for said fluid operator mounting same for limited horizontal movement, said support assembly including a fixed frame secured to said supporting structure and a mobile frame bearably supported upon said fixed frame for limited movement in a horizontal plane in a direction similar to said movable table, and a bracket component secured by one end thereof to said movable table and by the other end thereof to said mobile frame, said other end including a spring loaded lost motion assembly whereby movement of said movable table away from said fixed table delays movement of said heat shoe assembly by a predetermined amount and vice versa.

5. The device according to claim 1 in which said heat shoe assembly includes an elongated casing, an elongated electric element in said casing, means operatively connecting said element to said source of electrical energy, an elongated holder supporting said casing and said element, said means for moving said heat shoe assembly including at least one fluid operator in said supporting structure, said holder being secured to the piston rod of said fluid operator, said fluid operator being operatively connected to said source of fluid power, said fluid operator adapted to move said heat shoe assembly vertically relative to said tables.

6. The device according to claim 5 in which said means for moving said heat shoe assembly also includes further means for moving same sideways relative to said tables, said last mentioned means including a support assembly for said fluid operator mounting same for limited horizontal movement, said support assembly including a fixed frame secured to said supporting structure and a mobile frame bearably supported upon said fixed frame for limited movement in a horizontal plane in a direction similar to said movable table, and a bracket component secured by one end thereof to said movable table and by the other end thereof to said mobile frame, said other end including a spring loaded lost motion assembly whereby movement of said movable table away from said fixed table delays movement of said heat shoe assembly by a predetermined amount and vice versa.

7. The device according to claim 3 which includes means around said casing to prevent melted plastic from adhering thereto. said last means comprising a sleeve of glass fibre enveloping said casing, an elongated anchor member between said casing and said holder, said sleeve engaging around said anchor member, and screw threaded adjustment means cooperating between said holder and said anchor member for moving said anchor member away from said casing and hence tensioning said sleeve around said casing and around said anchor member.

8. The device according to claim 4 which includes means around said casing to prevent melted plastic from adhering thereto, said last means comprising a sleeve of glass fibre enveloping said casing, an elongated anchor member between said casing and said holder, said sleeve engaging around said anchor member, and screw threaded adjustment means cooperating between said holder and said anchor member for moving said anchor member away from said casing and hence tensioning said sleeve around said casing and around said anchor member.

9. The device according to claim 5 which includes means around said casing to prevent melted plastic from adhering thereto, said last means comprising a sleeve of glass fibre enveloping said casing, an elongated anchor member between said casing and said holder, said sleeve engaging around said anchor member, and screw threaded adjustment means cooperating between said holder and said anchor member for moving said anchor member away from said casing and hence tensioning said sleeve around said casing and around said anchor member.

10. The device according to claim 6 which includes means around said casing to prevent melted plastic from adhering thereto, said last means comprising a sleeve of glass fibre enveloping said casing, an elongated anchor member between said casing and said holder, said sleeve engaging around said anchor member, and screw threaded adjustment means cooperating between said holder and said anchor member for moving said anchor member away from said casing and hence tensioning said sleeve around said casing and around said anchor member.

11. A device for heat sealing together abutting edges of thermosetting plastic in association with a source of fluid power and a soruce of electrical energy; comprising in combination supporting structure, a fixed planar table supported on said supporting structure, a movable planar table also supported on said supporting structure and movable in the same plane as said fixed table, means mounting said movable table for movement towards and away from said fixed planar table, means to move said movable table as aforesaid, the adjacent inner edges of said table defining between them, a longitudinally extending gap when said tables are apart, a heat shoe assembly, means supporting said heat shoe assembly in said supporting structure, means for moving said heat shoe assembly from a position below said tables to a position inbetween said tables within said longitudinally extending gap, and means on each of said tables to clamp portions of plastic sheet to said tables with the adjacent edges of said plastic portions overlying the edges of said tables defining said longitudinally extending gap, said means to clamp portions of plastic sheet between said tables including an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

12. The device according to claim 1 in which said means to clamp portions of plastic sheet between said tables includes an elongated beam supported above each table inboard of the inner edges thereof, a plurality of fluid operators secured to said beam and extending downwardly therefrom, a balance bar pivotally secured to sand operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

13. The device according to claim 2 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

14. The device according to claim 3 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

15. The device according to claim 4 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

16. The device according to claim 15 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

17. The device according to claim 6 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators, including compression springs normally biassing same upwardly, said fluid operators being operatively connected to said source of fluid power.

18. The device according to claim 7 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

19. The device according to claim 8 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

20. The device according to claim 9 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

21. The device according to claim 10 in which said means to clamp portions of plastic sheet between said tables includes an elongated beam supported above each table inboard of the inner edges thereof, a plurality of fluid operators secured to said beam and extending downwardly therefrom, a balance bar pivotally secured to and operated by each of said fluid operators, and a plastic sheet engaging shoe pivotally secured to each end of said balance bar to equalize pressure exerted upon the associated plastic sheet by said fluid operators, said fluid operators including compression springs normally biassing same upwardly, said fluid operators being operatively connected to said source of fluid power.

* * * * *